(12) United States Patent
Ogawa

(10) Patent No.: US 11,600,889 B2
(45) Date of Patent: Mar. 7, 2023

(54) ENERGY STORAGE DEVICE

(71) Applicant: GS Yuasa International Ltd., Kyoto (JP)

(72) Inventor: Masumi Ogawa, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 47 days.

(21) Appl. No.: 17/042,723

(22) PCT Filed: Mar. 27, 2019

(86) PCT No.: PCT/JP2019/013151
§ 371 (c)(1),
(2) Date: Sep. 28, 2020

(87) PCT Pub. No.: WO2019/189341
PCT Pub. Date: Oct. 3, 2019

(65) Prior Publication Data
US 2021/0020885 A1 Jan. 21, 2021

(30) Foreign Application Priority Data
Mar. 29, 2018 (JP) .............................. JP2018-063942

(51) Int. Cl.
*H01M 50/409* (2021.01)
*H01M 50/538* (2021.01)
*H01M 10/0587* (2010.01)

(52) U.S. Cl.
CPC ..... *H01M 50/409* (2021.01); *H01M 10/0587* (2013.01); *H01M 50/538* (2021.01)

(58) Field of Classification Search
CPC ............ H01M 50/409; H01M 50/538; H01M 50/15; H01M 50/474; H01M 50/103;
(Continued)

(56) References Cited

U.S. PATENT DOCUMENTS

| | | |
|---|---|---|
| 7,819,929 B2 | 10/2010 | Nansaka et al. |
| 8,603,193 B2 | 12/2013 | Kondou et al. |
| 8,962,179 B2 | 2/2015 | Ahn |
| 10,158,101 B2 | 12/2018 | Minagata et al. |

(Continued)

FOREIGN PATENT DOCUMENTS

| | | |
|---|---|---|
| JP | H11-167913 A | 6/1999 |
| JP | 2000-251868 A | 9/2000 |

(Continued)

OTHER PUBLICATIONS

International Search Report (ISR) (PCT Form PCT/ISA/210), in PCT/JP2019/013151, dated May 28, 2019.

*Primary Examiner* — Matthew T Martin
*Assistant Examiner* — Katharine A Caughron
(74) *Attorney, Agent, or Firm* — McGinn I.P. Law Group, PLLC.

(57) ABSTRACT

An energy storage device includes an electrode assembly, a positive-electrode current collector, and an insulating sheet. The electrode assembly has a main body part and a connecting part projecting from the main body part and connected to the positive-electrode current collector. The insulating sheet has a sheet side surface part facing a side surface of the main body part, and a sheet extension part extending from the sheet side surface part. The sheet extension part is fixed to the electrode assembly.

17 Claims, 8 Drawing Sheets

(58) Field of Classification Search
CPC ........... H01M 50/477; H01M 10/0587; H01M 10/0431; H01M 10/052; Y02E 60/10
See application file for complete search history.

(56) References Cited

U.S. PATENT DOCUMENTS

| | | |
|---|---|---|
| 10,305,084 B2 | 5/2019 | Wakimoto et al. |
| 10,644,301 B2 | 5/2020 | Wakimoto et al. |
| 2009/0004561 A1 | 1/2009 | Nansaka et al. |
| 2010/0223780 A1 | 9/2010 | Kondou et al. |
| 2012/0052372 A1 | 3/2012 | Ahn |
| 2012/0301759 A1 | 11/2012 | Yoshitake et al. |
| 2015/0340663 A1 | 11/2015 | Minagata et al. |
| 2016/0336580 A1 | 11/2016 | Wakimoto et al. |
| 2019/0027711 A1 | 1/2019 | Minagata et al. |
| 2019/0288270 A1 | 9/2019 | Wakimoto et al. |

FOREIGN PATENT DOCUMENTS

| | | | |
|---|---|---|---|
| JP | 2005-302529 A | | 10/2005 |
| JP | 2009-032640 A | | 2/2009 |
| JP | 2010-232164 A | | 10/2010 |
| JP | 2012-049132 A | | 3/2012 |
| JP | 2013-041836 A | | 2/2013 |
| JP | 2014-038736 A | | 2/2014 |
| JP | 2014038736 A | * | 2/2014 |
| JP | 2014-041724 A | | 3/2014 |
| JP | 2014-072002 A | | 4/2014 |
| JP | 2015-041523 A | | 3/2015 |
| JP | 2015-046404 A | | 3/2015 |
| JP | WO2014/002647 A1 | | 5/2016 |
| JP | 2016-139491 A | | 8/2016 |
| JP | 2016-219123 A | | 12/2016 |

* cited by examiner

ENERGY STORAGE DEVICE

TECHNICAL FIELD

The present invention relates to an energy storage device including an electrode assembly and an insulating sheet that covers a side surface of the electrode assembly.

BACKGROUND ART

Conventionally, an energy storage device including an electrode assembly and an insulating sheet that covers a side surface of the electrode assembly is widely known. Patent Document 1 discloses a square nonaqueous electrolyte solution battery (an energy storage device) in which a battery element (an electrode assembly) is housed in a battery can (a case body) with a side surface covered with an insulation sheet.

PRIOR ART DOCUMENT

Patent Document

Patent Document 1: JP-A-2005-302529

SUMMARY OF THE INVENTION

Problems to be Solved by the Invention

In the above conventional energy storage device, there is a case where it is difficult to manufacture the energy storage device.

An object of the present invention is to provide an energy storage device that can be easily manufactured.

Means for Solving the Problems

An energy storage device according to one aspect of the present invention is an energy storage device including an electrode assembly, a current collector, and an insulating sheet. The electrode assembly has a main body part, and a connecting part projecting from the main body part and connected to the current collector. The insulating sheet has a sheet side surface part facing a side surface of the main body part, and a sheet extension part extending from the sheet side surface part. The sheet extension part is fixed to the electrode assembly.

The present invention can be realized not only as an energy storage device described above, but also as an electrode assembly and an insulating sheet.

Advantages of the Invention

The energy storage device according to the present invention can be easily manufactured.

MODE FOR CARRYING OUT THE INVENTION

Figure 1:
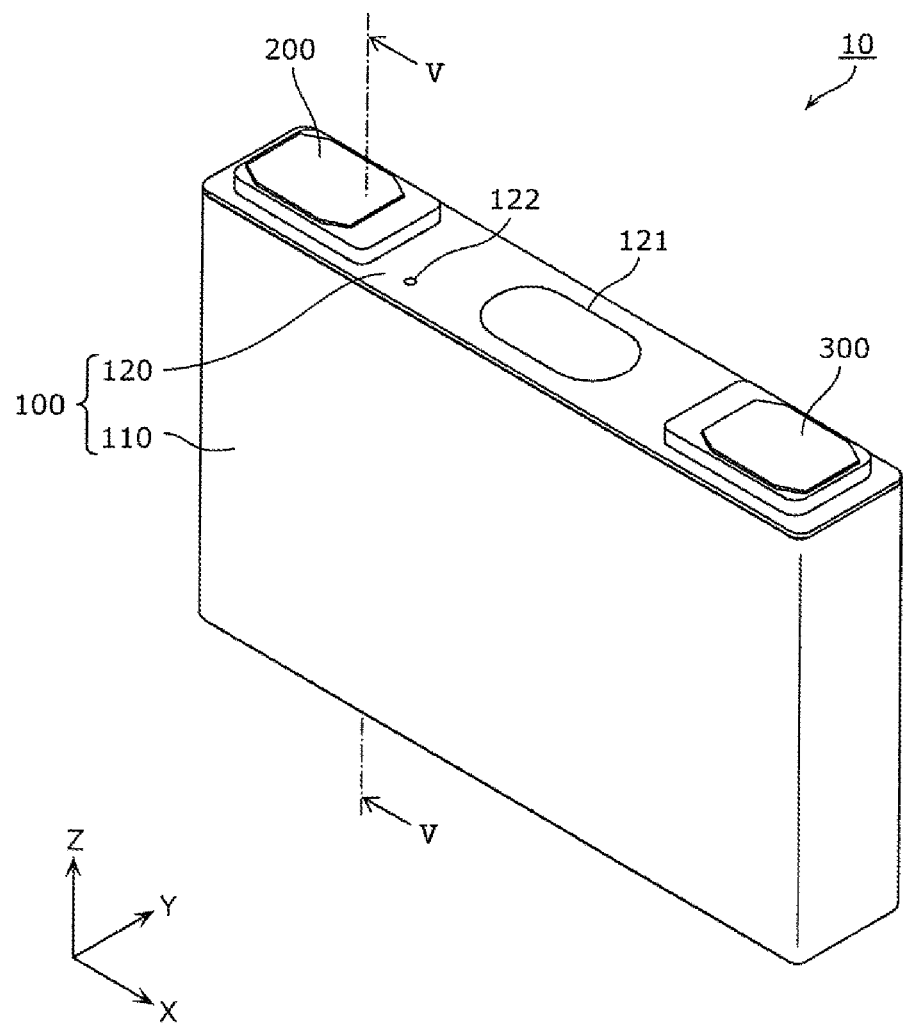
FIG. 1 is a perspective view illustrating an appearance of an energy storage device according to an embodiment.

In the above conventional energy storage device, there is a case where it is difficult to manufacture the energy storage device. As disclosed in Patent Document 1 described above, in a case where an end part of the insulating sheet is arranged on a lid side of the case, the insulating sheet is displaced, and there is a possibility that an end part of the insulating sheet is sandwiched between the case body and the lid when the case body and the lid are fitted together. Even in a case where an end part of the insulating sheet is not arranged on a lid side of the case, the end part of the insulating sheet may possibly be caught on an edge of the case body at a time of insertion of the electrode assembly into the case body. These may make it difficult to manufacture an energy storage device in the above-described conventional energy storage device.

An energy storage device according to one aspect of the present invention is an energy storage device including an electrode assembly, a current collector, and an insulating sheet. The electrode assembly has a main body part, and a connecting part projecting from the main body part and connected to the current collector. The insulating sheet has a sheet side surface part facing a side surface of the main body part, and a sheet extension part extending from the sheet side surface part. The sheet extension part is fixed to the electrode assembly.

According to this, in the energy storage device, the electrode assembly has the connecting part, which projects from the main body part, between with the current collector. The insulating sheet has the sheet side surface part facing a side surface of the main body part of the electrode assembly, and the sheet extension part extending from the sheet side surface part. The sheet extension part is fixed to the electrode assembly. In this way, by fixing the sheet extension part of the insulating sheet to the electrode assembly, it is possible to prevent, when manufacturing an energy storage device, a state where an end part of the insulating sheet (the sheet extension part) is sandwiched between a case body and a lid, or and a state where an end part of the insulating sheet is caught by an edge of the case body. This can facilitate manufacturing of the energy storage device.

The sheet extension part may be fixed to the connecting part.

According to this, the sheet extension part is fixed to the connecting part of the electrode assembly. That is, since the connecting part of the electrode assembly is a portion projecting from the main body part of the electrode assembly, it is easy to fix the sheet extension part. Therefore, by fixing the sheet extension part to the connecting part of the electrode assembly, it is possible to further facilitate manufacturing of the energy storage device. Since a relative displacement between the sheet extension part and the connecting part of the electrode assembly can be suppressed, the connecting part of the electrode assembly and the case can be more reliably insulated.

The sheet extension part may be arranged at least one of between the connecting part and the current collector, or between the connecting part and a supporting plate that sandwiches the connecting part with the current collector, and may be fixed to the electrode assembly.

According to this, the sheet extension part is arranged at least one of between the connecting part of the electrode assembly and the current collector, or between the supporting plate and the connecting part of the electrode assembly, and connected to the electrode assembly. In this way, by sandwiching the sheet extension part between the connecting part of the electrode assembly and the current collector or between the supporting plate and the connecting part of the electrode assembly, the sheet extension part can be easily fixed to the connecting part. This can further facilitate manufacturing of the energy storage device.

The connecting part and the current collector may have a joint part in which both are joined. An opening may be formed in the sheet extension part, and the joint part may be arranged so as to penetrate the opening.

According to this, the joint part of the connecting part of the electrode assembly and the current collector is arranged so as to penetrate the opening formed in the sheet extension part. In this way, by forming the joint part of the electrode assembly and the current collector in the opening of the sheet extension part, it is possible to selectively cause contacting and joining of portions desired to be joined in the electrode assembly and the current collector, and it is possible to secure an insulating property at other portions. For example, when joining by resistance welding, the sheet extension part suppresses energization of an unintended path, which can enhance a joining strength by concentrating electric power on the portions desired to be joined, and can suppress risk of occurrence of spatter generation. This can also facilitate manufacturing of the energy storage device.

The electrode assembly may have a plurality of the connecting parts aligned in a direction intersecting a projecting direction of the connecting part from the main body part, and the sheet extension part may be arranged so as to extend over the plurality of connecting parts.

According to this, the electrode assembly has the plurality of connecting parts, and the sheet extension part is arranged so as to extend over the plurality of connecting parts. In this way, by arranging the sheet extension part over the plurality of connecting parts of the electrode assembly, the sheet extension part can be firmly fixed to the electrode assembly, which can facilitate manufacturing of the energy storage device.

The electrode assembly may have a plurality of the connecting parts aligned in a direction intersecting a projecting direction of the connecting part from the main body part, and the insulating sheet may have a plurality of the sheet extension parts extending from the sheet side surface part so as to individually correspond to the plurality of connecting parts.

According to this, since the insulating sheet has the plurality of sheet extension parts extending individually corresponding to the plurality of connecting parts of the electrode assembly, an electrolyte solution can infiltrate between the plurality of sheet extension parts at a time of electrolyte solution filling. This can improve an electrolyte solution filling property while ensuring the insulation between the connecting part projecting from the electrode assembly and the case.

Hereinafter, with reference to the drawings, an energy storage device according to an embodiment (and a modified example thereof) of the present invention will be described. The embodiment described below illustrates a comprehensive or specific example. Each of numerical values, shapes, materials, constitutional elements, arrangement positions and connection forms of constitutional elements, manufacturing processes, orders of the manufacturing processes illustrated in the following embodiment is an example and is not intended to limit the present invention. Among constitutional elements in the following embodiment, constitutional elements not described in independent claims illustrating an uppermost concept are described as optional constitutional elements. In each figure, dimensions and the like are not strictly illustrated.

In the following description of the embodiment and drawings, in the energy storage device, an alignment direction of a pair of electrode terminals (a positive electrode terminal and a negative electrode terminal), an alignment direction of a pair of current collectors (a positive-electrode current collector and a negative-electrode current collector), or an opposing direction of a short side surface of the case is defined as an X-axis direction. An opposing direction of a long side surface of the case, a lateral direction of the short side surface of the case, or a thickness direction of the case is defined as a Y-axis direction. An alignment direction of a case body and a lid body of the energy storage device, a longitudinal direction of the short side surface of the case, a winding-axis direction of the electrode assembly, or a vertical direction is defined as a Z-axis direction. These X-axis direction, Y-axis direction, and Z-axis direction are directions that intersect each other (orthogonal in the present embodiment). Although the Z-axis direction may not be in the vertical direction depending on a usage mode, the Z-axis direction will be described below as the vertical direction for convenience of explanation. In the following description, an X-axis plus direction indicates an arrow direction of the X-axis, and an X-axis minus direction indicates a direction opposite to the X-axis plus direction. This similarly applies to the Y-axis direction and the Z-axis direction.

Embodiment

[1 Overall Description of Energy Storage Device 10]

Figure 2:
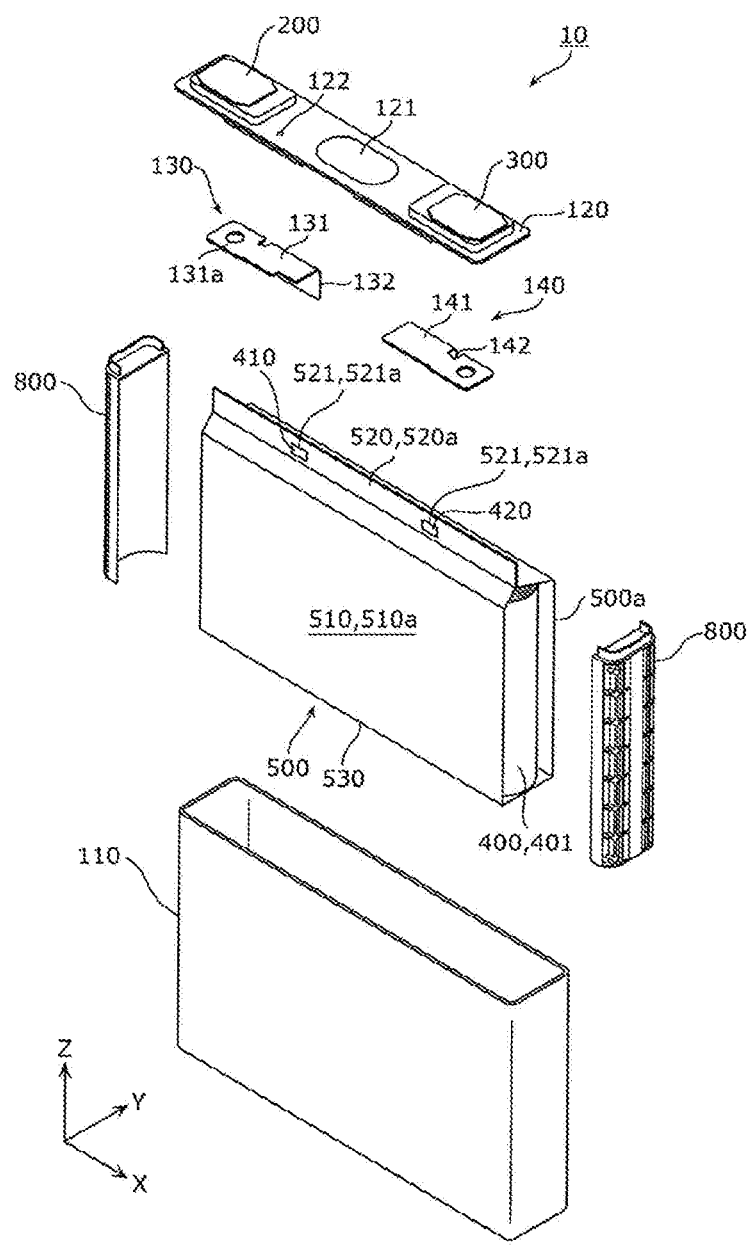
FIG. 2 is an exploded perspective view of the energy storage device according to the embodiment.
Figure 3:
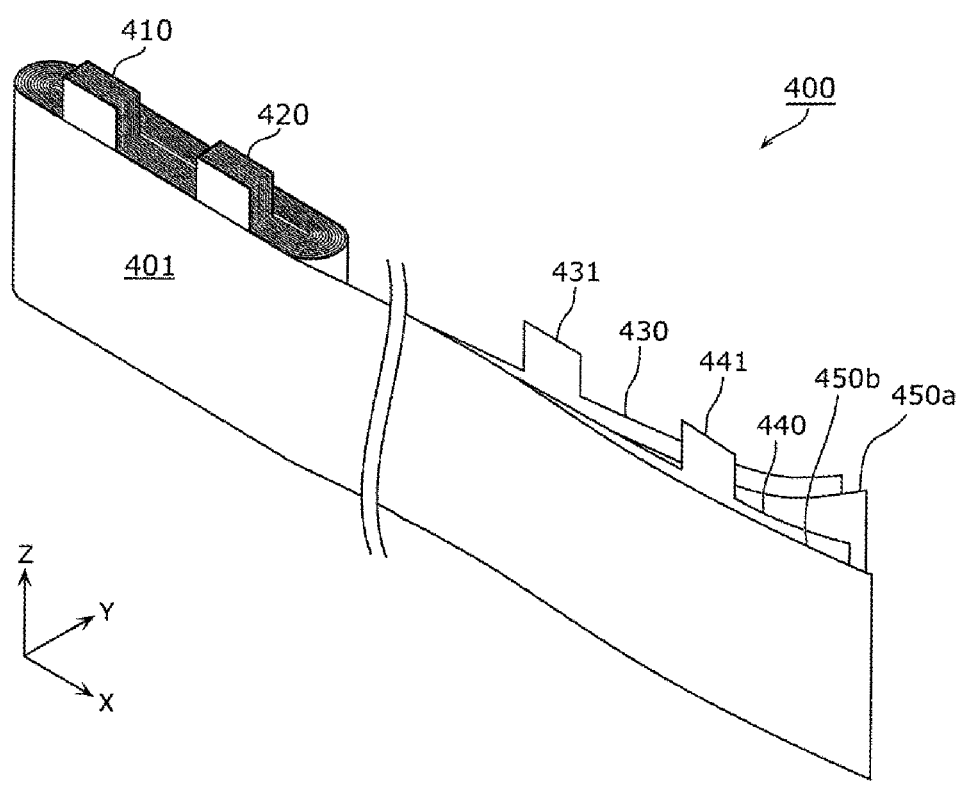
FIG. 3 is a perspective view illustrating a configuration of an electrode assembly according to the embodiment.
Figure 4:
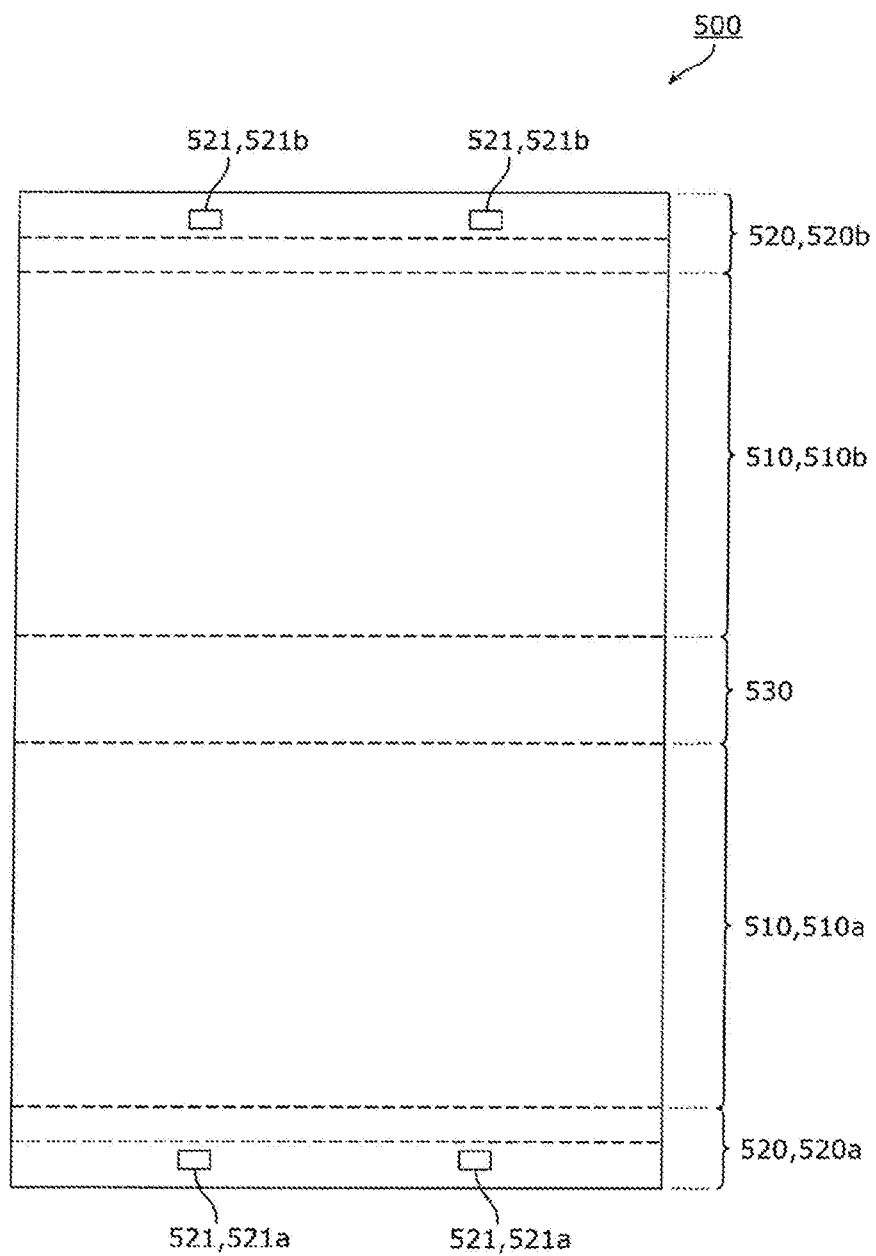
FIG. 4 is a plan view illustrating a configuration of an insulating sheet according to the embodiment.
Figure 5:
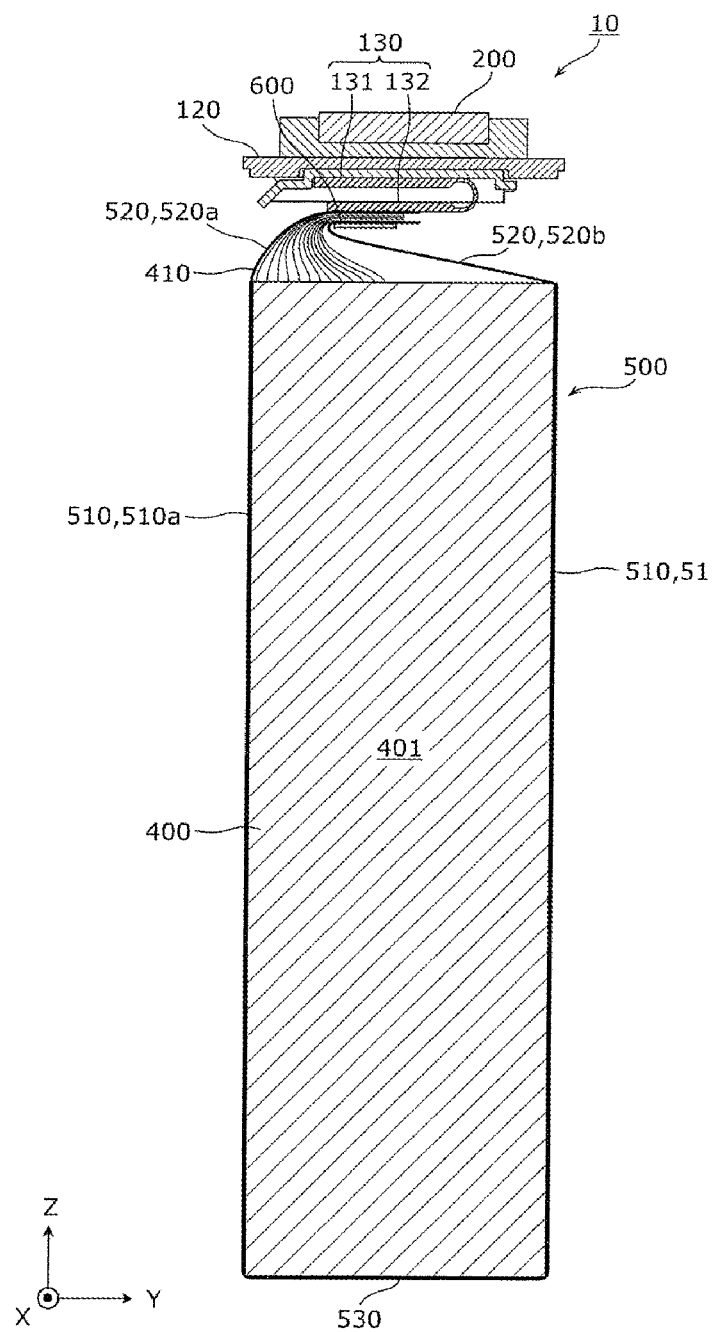
FIG. 5 is a cross-sectional view illustrating a configuration of the energy storage device according to the embodiment.

First, an overall description of an energy storage device 10 in the present embodiment will be given using FIGS. 1 to 5. FIG. 1 is a perspective view illustrating an appearance of the energy storage device 10 according to the present embodiment. FIG. 2 is an exploded perspective view of the energy storage device 10 according to the present embodiment. FIG. 3 is a perspective view illustrating a configuration of an electrode assembly 400 according to the present embodiment. FIG. 3 illustrates a configuration in a state where a winding state of the electrode assembly 400 illustrated in FIG. 2 is partially developed, and connecting parts 410 and 420 (tabs 431 and 441) are projected in a Z-axis plus direction. FIG. 4 is a plan view illustrating a configuration of an insulating sheet 500 according to the present embodiment. FIG. 4 illustrates a configuration in a developed state of the insulating sheet 500 illustrated in FIG. 2. FIG. 5 is a cross-sectional view illustrating a configuration of the energy storage device 10 according to the present embodiment. FIG. 5 is a cross-sectional view illustrating the configuration when the energy storage device 10 of FIG. 1 is cut along a plane parallel to a YZ plane that passes through line V-V, and illustrates with a case body 110 of a case 100 omitted.

The energy storage device 10 is a secondary battery capable of charge of electricity and discharge of electricity, and specifically is a nonaqueous electrolyte secondary battery such as a lithium ion secondary battery. The energy storage device 10 is used as a battery or the like for driving or starting an engine of mobile objects including a vehicle such as an electric vehicle (EV), a hybrid electric vehicle (HEV), or a plug-in hybrid electric vehicle (PHEV), a motorcycle, a watercraft, a snowmobile, agricultural machinery, construction machinery, and the like. The energy storage device 10 is not limited to a nonaqueous electrolyte secondary battery, but may be a secondary battery other than the nonaqueous electrolyte secondary battery or may be a capacitor. The energy storage device 10 may be not a secondary battery but a primary battery that can use stored electricity without a user having to charge. The energy storage device 10 may be a battery using a solid electrolyte. In the present embodiment, a rectangular parallelepiped (prismatic) electricity energy storage device 10 is illustrated, but the shape of the energy storage device 10 is not limited to a rectangular parallelepiped shape. The energy storage device 10 may have a polygonal columnar shape other than a rectangular parallelepiped shape, a cylindrical shape, an oval cylindrical shape, or the like, or may be a laminate type energy storage device.

As illustrated in FIG. 1, the energy storage device 10 includes the case 100 having the case body 110 and a lid body 120, a positive electrode terminal 200, and a negative electrode terminal 300. As illustrated in FIG. 2, the case 100 internally houses a positive-electrode current collector 130, a negative-electrode current collector 140, the electrode assembly 400, the insulating sheet 500, a spacer 800, and the like.

Between the lid body 120 and the positive electrode terminal 200 and the negative electrode terminal 300, and between the lid body 120 and the positive-electrode current collector 130 and the negative-electrode current collector 140, a gasket or the like for enhancement of electrical insulation and airtightness is arranged, but the description thereof is omitted. An electrolyte solution (nonaqueous electrolyte) is enclosed in the case 100, but is omitted in the drawing. The electrolyte solution is not particularly limited in type as long as the performance of the energy storage device 10 is not impaired, and various electrolyte solutions can be selected. In addition to the constitutional elements described above, a spacer or the like arranged above the electrode assembly 400 may be arranged.

[1.1 Description of Configuration of Case 100, Positive Electrode Terminal 200, and Negative Electrode Terminal 300]

The case 100 is a rectangular parallelepiped-shaped (box-shaped) case including the case body 110 having a rectangular tubular shape and a bottom, and the lid body 120 that is a plate-shaped member that closes an opening of the case body 110. The case 100 is configured to be able to seal the inside, by housing the electrode assembly 400 and the like inside the case body 110 and then welding the lid body 120 and the case body 110 together. The lid body 120 is provided with a gas release valve 121 that releases pressure inside the case 100 when the pressure inside the case 100 rises, and an electrolyte solution filling part 122 that is for injecting an electrolyte solution into the case 100. A material of the lid body 120 and the case body 110 is not particularly limited, but is preferably a weldable metal such as, for example, stainless steel, aluminum, aluminum alloy, iron, or plated steel sheet.

The positive electrode terminal 200 is an electrode terminal electrically connected to a positive electrode plate of the electrode assembly 400 via the positive-electrode current collector 130. The negative electrode terminal 300 is an electrode terminal electrically connected to a negative electrode plate of the electrode assembly 400 via the negative-electrode current collector 140. That is, the positive electrode terminal 200 and the negative electrode terminal 300 are metal electrode terminals that are for leading electricity stored in the electrode assembly 400 to an external space of the energy storage device 10, and introducing electricity into an internal space of the energy storage device 10 to store electricity in the electrode assembly 400. The positive electrode terminal 200 and the negative electrode terminal 300 are attached to the lid body 120. The positive electrode terminal 200 and the negative electrode terminal 300 are made of aluminum, aluminum alloy, copper, copper alloy, or the like.

[1.2 Description of Configuration of Electrode Assembly 400]

As illustrated in FIG. 3, the electrode assembly 400 is an energy storage element (a power generating element) that includes a positive electrode plate 430, a negative electrode plate 440, and separators 450*a* and 450*b*, and can store electricity. Specifically, the electrode assembly 400 is formed by winding a layer in which the separator 450*a* or 450*b* is arranged so as to be sandwiched between the positive electrode plate 430 and the negative electrode plate 440. That is, the electrode assembly 400 is formed by alternately stacking and winding the positive electrode plate 430 and the negative electrode plate 440, and the separators 450*a* and 450*b*, by stacking the positive electrode plate 430, the separator 450*a*, the negative electrode plate 440, and the separator 450*b* in this order. In the present embodiment, an oval shape is illustrated as the cross-sectional shape of the electrode assembly 400, but the cross-sectional shape may be an elliptical shape, a circular shape, a polygonal shape, or the like.

The positive electrode plate 430 is a plate (an electrode plate) in which a positive active material layer is formed on a surface of a positive electrode substrate layer that is a long metal foil made of aluminum, aluminum alloy, or the like. As a positive active material used in the positive active material layer, any known material can be appropriately used as long as the positive active material is capable of occlusion and release of lithium ions. As the positive active material, it is possible to use a polyanion compound such as $LiMPO_4$, $LiMSiO_4$, or $LiMBO_3$ (M is one or more kinds of transition metal elements selected from Fe, Ni, Mn, Co, and the like), lithium titanate, spinel lithium manganese oxide such as $LiMn_2O_4$ or $LiMn_{1.5}Ni_{0.5}O_4$, a lithium transition metal oxide such as $LiMO_2$ (M is one or more transition metal elements selected from Fe, Ni, Mn, Co, and the like), or the like.

The negative electrode plate 440 is a plate (an electrode plate) in which a negative active material layer is formed on a surface of a negative electrode substrate layer that is a long metal foil made of copper, copper alloy, or the like. As a negative active material used in the negative active material layer, any known material can be appropriately used as long as the negative active material is capable of occlusion and release of lithium ions. Examples of the negative active material include, in addition to lithium metal and lithium alloy (lithium-silicon, lithium-aluminum, lithium-lead, lithium-tin, lithium-aluminum-tin, lithium-gallium, and lithium metal-containing alloys such as wood alloy), alloy capable of occlusion and release of lithium, a carbon material (e.g., graphite, hardly graphitizable carbon, easily graphitizable carbon, low-temperature fired carbon, amorphous carbon, or the like), silicon oxide, metal oxide, lithium metal oxide ($Li_4Ti_5O_{12}$ or the like), a polyphosphoric acid compound, or a compound of a transition metal and a group 14 to group 16 element such as $Co_3O_4$ or $Fe_2P$, which is generally called a conversion negative electrode.

The separators 450a and 450b are microporous sheets made of resin. As a material of the separators 450a and 450b, a known material can be appropriately used as long as the performance of the energy storage device 10 is not impaired.

The positive electrode plate 430 has a plurality of rectangular tabs 431 projecting outward at one end in a winding-axis direction. Similarly, the negative electrode plate 440 also has a plurality of rectangular tabs 441 projecting outward at one end in the winding-axis direction. The plurality of tabs 431 and the plurality of tabs 441 are portions where an active material is not formed (coated) and a substrate layer is exposed (an active material non-formed portion or an active material uncoated portion). The winding axis is a virtual axis that serves as a central axis in winding the positive electrode plate 430 and the negative electrode plate 440, and is a straight line passing through a center of the electrode assembly 400 and parallel to the Z-axis direction, in the present embodiment.

The plurality of tabs 431 and the plurality of tabs 441 are arranged at an end on the same side in the winding-axis direction (in FIG. 3, an end on the Z-axis plus direction side), and stacked at a predetermined position on the electrode assembly 400 by the positive electrode plate 430 and the negative electrode plate 440 being stacked. As a result, the electrode assembly 400 is formed with the connecting part 410 formed by stacking the plurality of tabs 431 and the connecting part 420 formed by stacking the plurality of tabs 441. The connecting parts 410 and 420 are gathered together toward the center in a stacking direction (the Y-axis direction in FIG. 3), for example, and are joined to the positive-electrode current collector 130 and the negative-electrode current collector 140 by welding or the like.

As described above, the connecting parts 410 and 420 are portions that are arranged so as to project from a main body part 401 of the electrode assembly 400 and that are connected to the positive-electrode current collector 130 and the negative-electrode current collector 140. The main body part 401 is a portion included in the main body of the electrode assembly 400, and is specifically a portion of the electrode assembly 400 other than the connecting parts 410 and 420 (other than the tabs 431 and 441). That is, the main body part 401 is an oval cylindrical portion (an active material formed portion or an active material coated portion) formed by winding a part formed (coated) with an active material of the positive electrode plate 430 and the negative electrode plate 440 and the separators 450a and 450b.

The connecting parts 410 and 420 are arranged side by side in the X-axis direction. That is, the electrode assembly 400 has a plurality of connecting parts aligned in a direction (the X-axis direction) intersecting a projecting direction (the Z-axis plus direction) of the connecting part from the main body part 401. The connecting parts 410 and 420 are joined to the positive-electrode current collector 130 and the negative-tive-electrode current collector 140, and then bent in the Y-axis plus direction (see FIG. 5). Specifically, the connecting parts 410 and 420 are joined to the positive-electrode current collector 130 and the negative-electrode current collector 140 in a state of projecting from a part of the main body part 401 of the electrode assembly 400 in the Z-axis plus direction, and bent, after being joined, in the Y-axis plus direction to become a state of being extended in the Y-axis plus direction. That is, the connecting parts 410 and 420 are portions obtained by stacking, in the Z-axis direction, the plurality of tabs 431 and 441 projecting from a part of the main body part 401 of the electrode assembly 400 in the Z-axis plus direction and extending in the Y-axis plus direction.

[1.3 Description of Configuration of Insulating Sheet 500 and Spacer 800]

The insulating sheet 500 is a sheet-shaped (film-shaped) member having an electrical insulating property. The insulating sheet 500 is arranged so as to cover the electrode assembly 400, to electrically insulate the electrode assembly 400 from other members (the case 100, the positive-electrode current collector 130, the negative-electrode current collector 140, and the like). The insulating sheet 500 is made of an insulating material such as polypropylene (PP), polyethylene (PE), polyphenylene sulfide resin (PPS), polyethylene terephthalate (PET), polyether ether ketone (PEEK), tetrafluoroethylene/perfluoroalkyl vinyl ether (PFA), polytetrafluoroethylene (PTFE), polybutylene terephthalate (PBT), polyether sulfone (PES), and a composite material thereof.

Specifically, as illustrated in FIGS. 2 and 4, the insulating sheet 500 has a sheet side surface part 510, a sheet extension part 520, and a sheet bottom surface part 530. The sheet side surface part 510 is a rectangular flat-plate-shaped portion facing a side surface of the main body part 401 of the electrode assembly 400. That is, the sheet side surface part 510 has a rectangular flat-plate-shaped sheet side surface part 510a that covers a side surface of the main body part 401 of the electrode assembly 400 on the Y-axis minus direction side, and a rectangular flat-plate-shaped sheet side surface part 510b that covers a side surface of the main body part 401 of the electrode assembly 400 on the Y-axis plus direction side. The sheet side surface part 510 (the sheet side surface parts 510a and 510b) covers the entire side surface of the main body part 401 of the electrode assembly 400, but may be configured to cover only a part of the side surface, and may have a shape that is curved along the main body part 401 instead of the flat-plate shape, for example.

The sheet extension part 520 is a rectangular plate-shaped portion that extends from the sheet side surface part 510 toward the connecting parts 410 and 420 in the Z-axis plus direction, and is fixed to the electrode assembly 400. Specifically, the sheet extension part 520 is arranged so as to extend from the sheet side surface part 510 toward the connecting parts 410 and 420 of the main body part 401 of the electrode assembly 400, and is fixed to the connecting parts 410 and 420. That is, the sheet extension part 520 is arranged so as to extend over the plurality of connecting parts (the positive electrode side connecting part 410 and the negative electrode side connecting part 420) of the electrode assembly 400. In other words, the sheet extension part 520 extends from the sheet side surface part 510 along the electrode assembly 400 (along the connecting parts 410 and 420) and is arranged at a position sandwiching the connecting parts 410 and 420.

The sheet extension part 520 has a rectangular plate-shaped sheet extension part 520a arranged on the Y-axis minus direction side of the connecting parts 410 and 420, and a rectangular plate-shaped sheet extension part 520b arranged on the Y-axis plus direction side of the connecting parts 410 and 420. That is, the sheet extension part 520a extends from an edge of the sheet side surface part 510a on the Z-axis plus direction side while inclining in the Y-axis plus direction, and bends in the Z-axis plus direction to be fixed to surfaces of the connecting parts 410 and 420 on the Y-axis minus direction side. As described above, the sheet extension part 520a is a long portion that extends in the X-axis direction over the connecting parts 410 and 420 along the surfaces of the connecting parts 410 and 420 on the Y-axis minus direction side. The sheet extension part 520b extends from an edge of the sheet side surface part 510b on the Z-axis plus direction side while inclining in the Y-axis minus direction, and bends in the Z-axis plus direction to be fixed to surfaces of the connecting parts 410 and 420 on the Y-axis minus plus direction side. As described above, the sheet extension part 520b is a long portion that extends in the X-axis direction over the connecting parts 410 and 420 along the surfaces of the connecting parts 410 and 420 on the Y-axis plus direction side.

In the sheet extension part 520, openings 521 that expose the connecting parts 410 and 420 are formed. That is, in the sheet extension part 520a, two rectangular openings 521a exposing the surfaces of the connecting parts 410 and 420 on the Y-axis minus direction side are formed at positions corresponding to the connecting parts 410 and 420. In the sheet extension part 520b, two rectangular openings 521b exposing the surfaces of the connecting parts 410 and 420 on the Y-axis plus direction side are formed at positions corresponding to the connecting parts 410 and 420.

The sheet bottom surface part 530 is a rectangular flat-plate-shaped portion that is arranged so as to face a bottom surface side (the Z-axis minus direction side) of the electrode assembly 400. That is, the sheet bottom surface part 530 is a portion that is arranged between the sheet side surface part 510a and the sheet side surface part 510b, and connects edges of the sheet side surface part 510a and the sheet side surface part 510b on the Z-axis minus direction side. The sheet bottom surface part 530 covers the entire bottom surface of the electrode assembly 400, but may be configured to cover only a part of the bottom surface, and may have a shape that is curved, for example, instead of the flat-plate shape.

In this way, the insulating sheet 500 is not arranged on both sides of the electrode assembly 400 in the X-axis direction. This causes, as illustrated in FIG. 2, formation of side openings 500a, which are openings that are substantially rectangular and extend in the Z-axis direction on both sides of the electrode assembly 400 in the X-axis direction, by the insulating sheet 500 being attached (wound) to the electrode assembly 400. The spacer 800 is inserted into this side opening 500a and attached to the electrode assembly 400.

The spacer 800 is a columnar side spacer that is arranged so as to extend in the Z-axis direction between an inner surface of the case 100 and both side surfaces of the electrode assembly 400 in the X-axis direction, and regulates a position of the electrode assembly 400 in the case 100. The spacer 800 is made by a similar insulating material to the insulating sheet 500 such as PP or PE, and electrically insulates the case 100 and both side surfaces of the electrode assembly 400 in the X-axis direction.

[1.4 Description of Configuration of Positive-Electrode Current Collector 130 and Negative-Electrode Current Collector 140]

The positive-electrode current collector 130 and the negative-electrode current collector 140 are plate-shaped members that are arranged between the lid body 120 and the electrode assembly 400, and electrically connect the positive electrode terminal 200 and the negative electrode terminal 300 to the positive electrode plate 430 and the negative electrode plate 440 of the electrode assembly 400. That is, one end of the positive-electrode current collector 130 is connected to the positive electrode terminal 200, and another end is connected to the positive electrode side connecting part 410 of the electrode assembly 400. One end of the negative-electrode current collector 140 is connected to the negative electrode terminal 300, and another end is connected to the negative electrode side connecting part 420 of the electrode assembly 400. The positive-electrode current collector 130 is made of aluminum, aluminum alloy, or the like, similarly to the positive electrode substrate layer of the positive electrode plate 430. The negative-electrode current collector 140 is made of copper, copper alloy, or the like, similarly to the negative electrode substrate layer of the negative electrode plate 440.

Specifically, the positive-electrode current collector 130 has a terminal-side arrangement part (a terminal connecting part) 131 and an electrode-assembly-side arrangement part (an electrode assembly connecting part) 132. The terminal-side arrangement part 131 is a plate-shaped member that is joined to the positive electrode terminal 200 by swaging or the like to be electrically connected. That is, by inserting a shaft part (rivet part) of the positive electrode terminal 200 into a through hole of the lid body 120 and a through hole 131a of the terminal-side arrangement part 131 and swaging, the terminal-side arrangement part 131 is fixed to the lid body 120 together with the positive electrode terminal 200.

The electrode-assembly-side arrangement part 132 is a plate-shaped member that is joined to the connecting part 410 of the electrode assembly 400 by welding or the like. That is, the electrode-assembly-side arrangement part 132 is joined to the connecting part 410 in a state where the sheet extension part 520 of the insulating sheet 500 is sandwiched between with the connecting part 410, which fixes the sheet extension part 520 to the electrode-assembly-side arrangement part 132 and the connecting part 410. A detailed description of the configuration in which the electrode-assembly-side arrangement part 132 of the positive-electrode current collector 130 is joined to the connecting part 410 of the electrode assembly 400 will be described later.

FIG. 2 illustrates a state where the electrode-assembly-side arrangement part 132 is joined to the connecting part 410 at a time of manufacturing the energy storage device 10. However, as illustrated in FIG. 5, in the state of FIG. 1 (state after joining), the electrode-assembly-side arrangement part 132 is further bent toward the terminal-side arrangement part 131. That is, when the energy storage device 10 is manufactured, as illustrated in FIG. 2, in the positive-electrode current collector 130, the terminal-side arrangement part 131 is joined to the positive electrode terminal 200, and the electrode-assembly-side arrangement part 132 is joined to the connecting part 410, in a state where the terminal-side arrangement part 131 and the electrode-assembly-side arrangement part 132 are bent at a substantially right angle. Then, as illustrated in FIG. 5, from the viewpoint of space saving and the like, the electrode-assembly-side arrangement part 132 is further bent toward the terminal-side arrangement part 131 to be substantially parallel to the terminal-side arrangement part 131 (that is, the positive-electrode current collector 130 becomes a substantially U shape when viewed from the X-axis direction), the electrode assembly 400 and the like are housed in the case 100, and the state illustrated in FIG. 1 is obtained.

As a result, the sheet extension part 520a is arranged between a distal end portion of the connecting parts 410 and 420 and a wall portion (the lid body 120) of the case 100 facing the distal end portion. The sheet extension part 520*b* is arranged at a position sandwiching the distal end portion of the connecting parts 410 and 420 between with the wall portion (the lid body 120) of the case 100.

Similarly to the positive-electrode current collector 130, the negative-electrode current collector 140 also has a terminal-side arrangement part 141 and an electrode-assembly-side arrangement part 142. Since the negative-electrode current collector 140 has a configuration similar to the positive-electrode current collector 130, the detailed description thereof will be omitted.

[2 Description of Joint Configuration of Positive-Electrode Current Collector 130 and Connecting Part 410 of Electrode Assembly 400]

Figure 6:
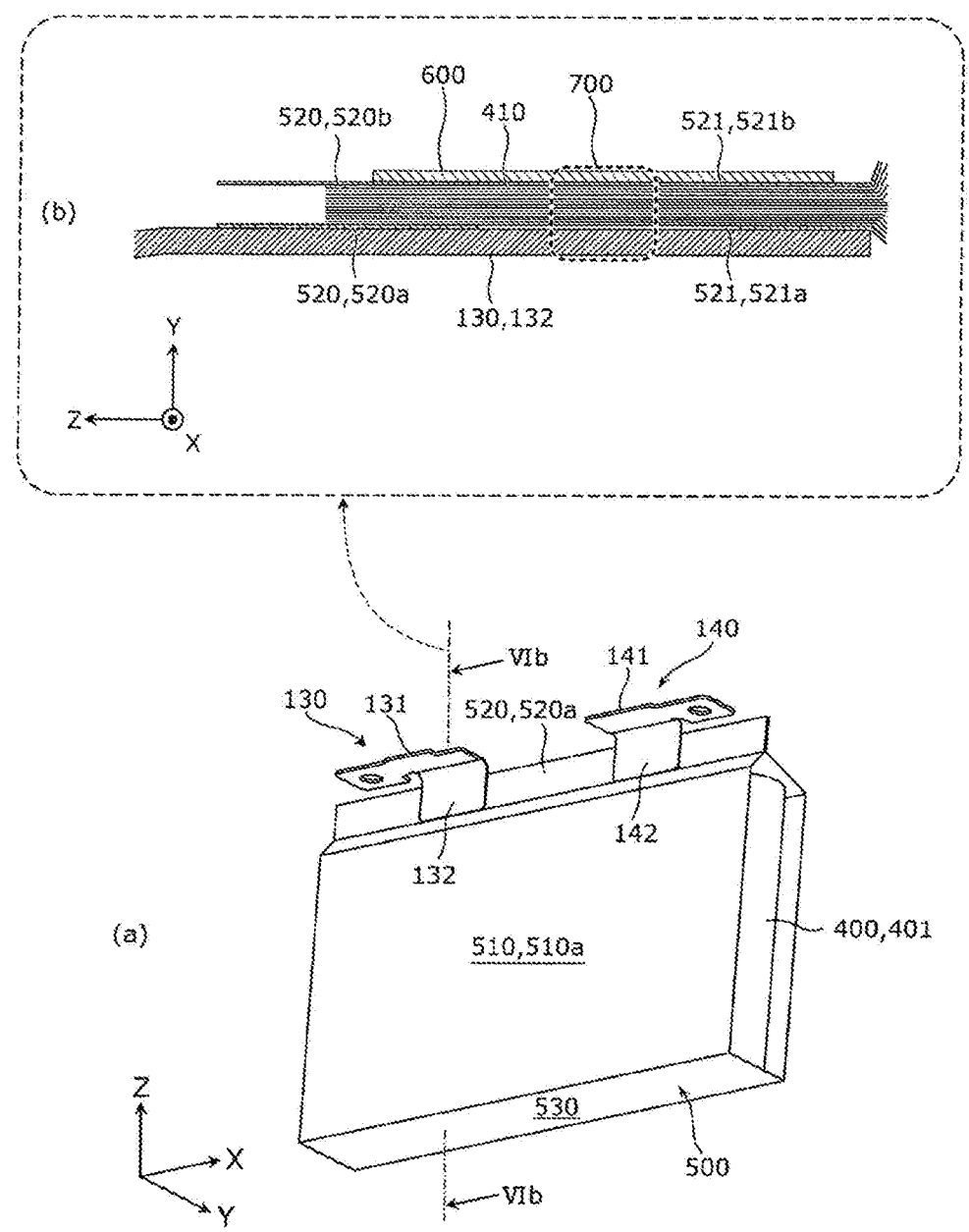
FIG. 6 is a perspective view and a cross-sectional view illustrating a joint configuration of a positive-electrode current collector and a connecting part of the electrode assembly according to the embodiment.

Next, a configuration in a state where the positive-electrode current collector 130 and the connecting part 410 of the electrode assembly 400 are joined together will be described in detail. FIG. 6 is a perspective view and a cross-sectional view illustrating a joint configuration between the positive-electrode current collector 130 and the connecting part 410 of the electrode assembly 400 according to the present embodiment. Specifically, FIG. 6(*a*) is a perspective view of a state where the positive-electrode current collector 130 and the negative-electrode current collector 140 are joined to the electrode assembly 400, as viewed from diagonally below. In FIG. 6(*a*), for convenience of description, configurations other than the positive-electrode current collector 130, the negative-electrode current collector 140, the electrode assembly 400, and the insulating sheet 500 are omitted. FIG. 6(*b*) is a cross-sectional view illustrating a cross section when the configuration of FIG. 6(*a*) is cut along a VIb-VIb cross section.

FIG. 6 illustrates, as described above, a configuration in a state where the connecting parts 410 and 420 at the time of joining of the positive-electrode current collector 130 and the negative-electrode current collector 140 to the electrode assembly 400 project in the Z-axis plus direction (a state where the electrode-assembly-side arrangement parts 132 and 142 are not further bent). FIG. 6(*b*) illustrates a configuration on the positive electrode side (the positive-electrode current collector 130, the connecting part 410, and the like), and the configuration on the positive electrode side will be described below. However, the negative electrode side (the negative-electrode current collector 140, the connecting part 420, and the like) has a similar configuration.

As illustrated in FIG. 6, the connecting part 410 of the electrode assembly 400 is arranged so as to be sandwiched between the positive-electrode current collector 130 and a supporting plate 600 in the Y-axis direction (the Z-axis direction in the state of FIG. 5). That is, in the present embodiment, the supporting plate 600 is arranged on the Y-axis plus direction side of the connecting part 410 (the Z-axis minus direction side in the state of FIG. 5). The supporting plate 600 is a cover that is arranged at a position sandwiching the connecting part 410 between with the positive-electrode current collector 130 to protect the connecting part 410. Specifically, the supporting plate 600 is a rectangular flat-plate-shaped member that extends in the XZ plane along the connecting part 410. A material of this supporting plate 600 is not particularly limited, but is a metal member made of aluminum, aluminum alloy, or the like, similarly to the positive electrode substrate layer of the positive electrode plate 430 of the electrode assembly 400. Similarly, a supporting plate is also arranged on the negative electrode side. A material of the supporting plate on the negative electrode side is not particularly limited as well, but is a metal member made of copper, copper alloy, or the like, similarly to the negative electrode substrate layer of the negative electrode plate 440 of the electrode assembly 400.

Between the connecting part 410 and the positive-electrode current collector 130 and between the supporting plate 600 and the connecting part 410, the sheet extension part 520 is arranged. That is, the sheet extension part 520*a* is arranged between the connecting part 410 and the electrode-assembly-side arrangement part 132 of the positive-electrode current collector 130, and the sheet extension part 520*b* is arranged between the supporting plate 600 and the connecting part 410.

The connecting part 410, the positive-electrode current collector 130, and the supporting plate 600 are joined together to form a joint part 700. That is, the connecting part 410 and the positive-electrode current collector 130 have the joint part 700 in which both are joined. Specifically, at a position inside the opening 521 formed in the sheet extension part 520, the connecting part 410, the positive-electrode current collector 130, and the supporting plate 600 are joined together to form the joint part 700. In this way, the joint part 700 is arranged so as to penetrate the opening 521 (the openings 521*a* and 521*b*) of the sheet extension part 520. In other words, a joined portion of the connecting part 410 and the positive-electrode current collector 130 of the joint part 700 is arranged so as to penetrate the opening 521*a*, and a joined portion of the supporting plate 600 and the connecting part 410 is arranged so as to penetrate the opening 521*b*. In the present embodiment, the joint part 700 is a welded portion formed by resistance welding.

Such a configuration allows the sheet extension part 520 to be arranged on at least one (both in the present embodiment) of between the connecting part 410 and the positive-electrode current collector 130 or between the supporting plate 600 and the connecting part 410, and fixed to the electrode assembly 400. That is, the sheet extension part 520*a* is directly fixed to the connecting part 410 and the electrode-assembly-side arrangement part 132, by being arranged between the connecting part 410 and the electrode-assembly-side arrangement part 132 of the positive-electrode current collector 130, and sandwiched between the connecting part 410 and the electrode-assembly-side arrangement part 132. The sheet extension part 520*b* is directly fixed to the supporting plate 600 and the connecting part 410, by being arranged between the supporting plate 600 and the connecting part 410, and sandwiched between the supporting plate 600 and the connecting part 410.

[3 Description of Effect]

As described above, according to the energy storage device 10 according to the embodiment of the present invention, the electrode assembly 400 has the connecting part 410 projecting from the main body part 401 and connected to the positive-electrode current collector 130. Further, the insulating sheet 500 has the sheet side surface part 510 facing a side surface of the main body part 401 of the electrode assembly 400, and the sheet extension part 520 extending from the sheet side surface part 510 and arranged on the connecting part 410 side of the main body part 401 of the electrode assembly 400. Furthermore, the sheet extension part 520 is fixed to the electrode assembly 400. In this way, by fixing the sheet extension part 520 of the insulating sheet 500 to the electrode assembly 400, when manufacturing the energy storage device 10, it is possible to prevent a state where an end part of the insulating sheet 500 (the sheet extension part 520) is sandwiched between the case body 110 and the lid body 120, or a state where an end part of the insulating sheet 500 is caught by the end edge of the case body 110. This can facilitate manufacturing of the energy storage device 10. By extending the insulating sheet 500 from the side surface side of the main body part 401 of the electrode assembly 400 and by arranging the insulating sheet 500 also on the connecting part 410 side of the main body part 401 of the electrode assembly 400, the connecting part 410 side of the main body part 401 of the electrode assembly 400 can also be insulated.

Specifically, when the electrode assembly 400 has the connecting part 410 projecting from the main body part 401, the connecting part 410 of the electrode assembly 400 may come into contact with the case 100 to cause a short circuit. Therefore, by providing the sheet extension part 520 to the insulating sheet 500, insulation of the electrode assembly 400 between the connecting part 410 and the case 100 can be ensured. Whereas, the insulating sheet 500 does not have high rigidity and is easy to move. As a result, the sheet extension part 520 is easily sandwiched between the case body 110 of the case 100 and the lid body 120. Therefore, by fixing the sheet extension part 520 to another member, it is possible to prevent the sheet extension part 520 from being sandwiched between the case body 110 and the lid body 120. In particular, when the sheet extension part 520 is fixed to the electrode assembly 400, a relative displacement between the insulating sheet 500 and the electrode assembly 400 can be suppressed, which can increase reliability of insulation between the case 100 and the electrode assembly 400.

The sheet extension part 520 is fixed to the connecting part 410 of the electrode assembly 400. That is, since the connecting part 410 of the electrode assembly 400 is a portion projecting from the main body part 401 of the electrode assembly 400, it is easy to fix the sheet extension part 520. Therefore, by fixing the sheet extension part 520 to the connecting part 410 of the electrode assembly 400, it is possible to further facilitate manufacturing of the energy storage device 10. Since a relative displacement between the sheet extension part 520 and the connecting part 410 of the electrode assembly 400 can be suppressed, the connecting part 410 of the electrode assembly 400 and the case 100 can be more reliably insulated.

The sheet extension part 520 is arranged at least one of between the connecting part 410 of the electrode assembly 400 and the positive-electrode current collector 130, or between the supporting plate 600 and the connecting part 410 of the electrode assembly 400, and fixed to the electrode assembly 400. In this way, by sandwiching the sheet extension part 520 between the connecting part 410 of the electrode assembly 400 and the positive-electrode current collector 130, or between the supporting plate 600 and the connecting part 410 of the electrode assembly 400, the sheet extension part 520 can be easily fixed to the connecting part 410. This can further facilitate manufacturing of the energy storage device 10.

The joint part 700 of the connecting part 410 of the electrode assembly 400 and the positive-electrode current collector 130 is arranged so as to penetrate the opening 521 formed in the sheet extension part 520. In this way, by forming the joint part 700 of the electrode assembly 400 and the positive-electrode current collector 130 in the opening 521 of the sheet extension part 520, it is possible to selectively cause contacting and joining of portions desired to be joined each other in the electrode assembly 400 and the positive-electrode current collector 130, and to secure an insulating property in other parts. When joining by resistance welding, the sheet extension part 520 suppresses energization of an unintended path, which can enhance a joining strength by concentrating electric power on the portions desired to be joined, and can suppress risk of occurrence of spatter generation. This can also facilitate manufacturing of the energy storage device 10.

The electrode assembly 400 has a plurality of connecting parts (the connecting parts 410 and 420), and the sheet extension part 520 is arranged so as to extend over the plurality of connecting parts. In this way, since the sheet extension part 520 is arranged over the plurality of connecting parts of the electrode assembly 400, the sheet extension part 520 can be firmly fixed to the electrode assembly 400, which can facilitate manufacturing of the energy storage device 10. The sheet extension part 520 can also insulate a portion between the plurality of connecting parts of the electrode assembly 400.

The insulating sheet 500 has the side openings 500a on both sides of the electrode assembly 400 in the X-axis direction, and the spacers 800 are arranged at the side openings 500a. In this way, the insulating sheet 500 does not need to be provided on both sides of the electrode assembly 400 in the X-axis direction, which can simplify the configuration of the insulating sheet 500. This can facilitate manufacturing of the energy storage device 10. By not providing the insulating sheets 500 on both sides of the electrode assembly 400 in the X-axis direction, space can be saved.

The description above has been mainly on an effect of the configuration on the positive electrode side (the positive-electrode current collector 130 and the connecting part 410 side of the electrode assembly 400), but a similar effect can be obtained regarding the configuration on the negative electrode side (the negative-electrode current collector 140 and the connecting part 420 side of the electrode assembly 400).

[4 Description of Modified Example of Embodiment]

Figure 7:
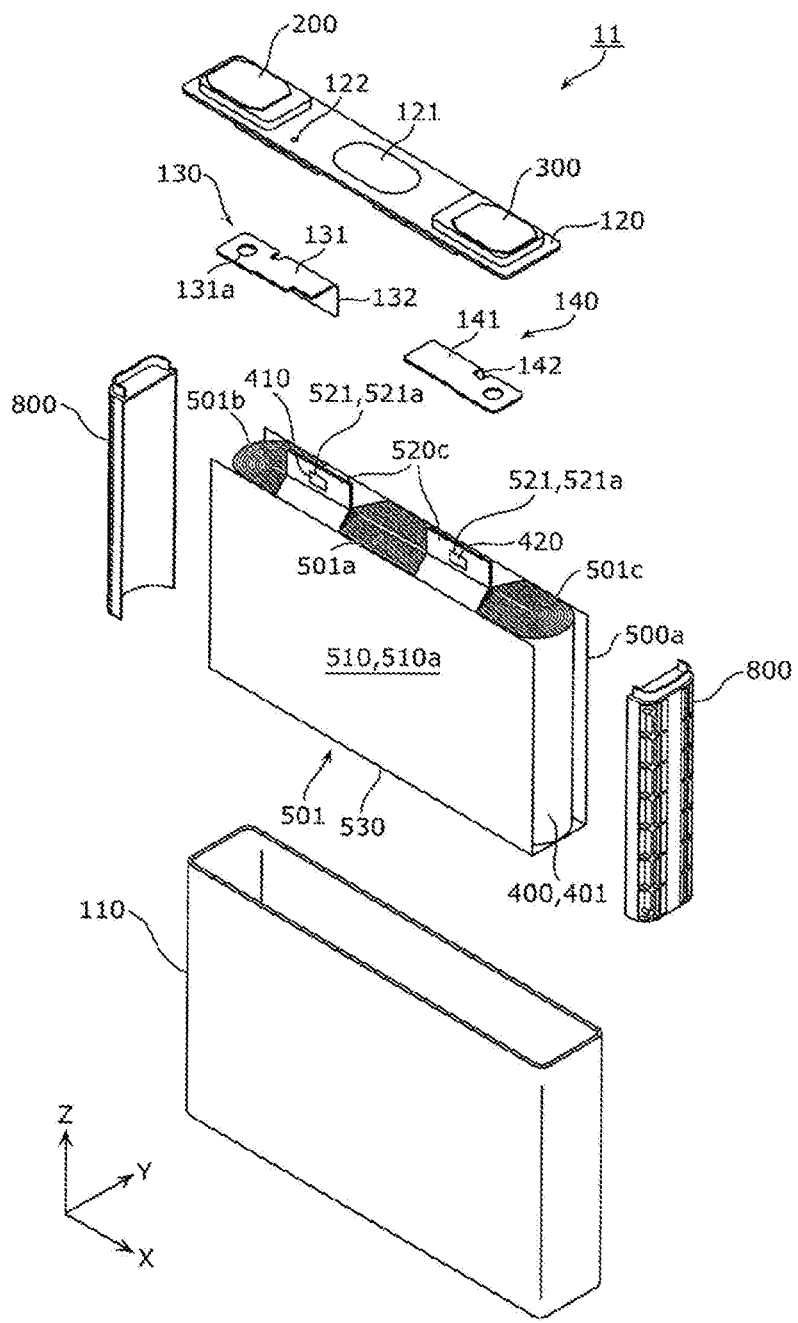
FIG. 7 is an exploded perspective view of an energy storage device according to a modified example of the embodiment.
Figure 8:
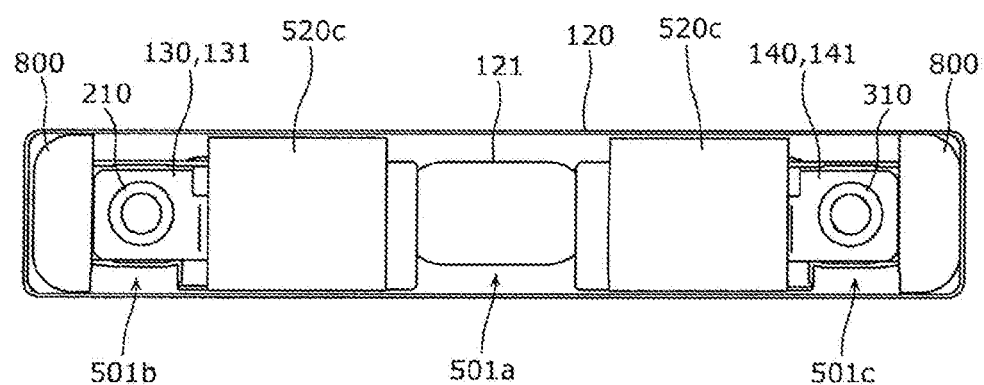
FIG. 8 is a view for explaining arrangement positions of a central opening and an end opening formed by a sheet extension part of an insulating sheet according to the modified example of the present embodiment.
Figure 8:
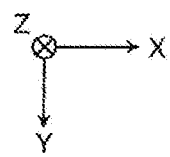

Next, a modified example of the present embodiment will be described. In the above-described embodiment, the sheet extension part 520 of the insulating sheet 500 is arranged so as to extend over the connecting parts 410 and 420 of the electrode assembly 400. In this modified example, the sheet extension part is not extended over the connecting parts 410 and 420, but is divided into a portion corresponding to a connecting part 410 and a portion corresponding to a connecting part 420. FIG. 7 is an exploded perspective view of an energy storage device 11 according to the modified example of the present embodiment. FIG. 8 is a view for explaining arrangement positions of a central opening 501a and end openings 501b and 501c formed by a sheet extension part 520c of an insulating sheet 501 according to the modified example of the present embodiment. Specifically, FIG. 8 is a bottom view of a configuration around the sheet extension part 520c in the energy storage device 11 when viewed from the Z-axis minus direction side.

As illustrated in FIG. 7, the energy storage device 11 in the present modified example includes the insulating sheet 501 instead of the insulating sheet 500 of the energy storage device 10 in the above-described embodiment. The insulating sheet 501 has a plurality of sheet extension parts 520c instead of the sheet extension part 520 of the insulating sheet 500 in the above-described embodiment. Other configurations of the energy storage device 11 in the present modified example are similar to the respective constitutional elements of the energy storage device 10 in the above-described embodiment, and therefore the description thereof will be omitted.

An electrode assembly 400 has a plurality of (two) connecting parts 410 and 420 aligned in a direction (the X-axis direction) intersecting a projecting direction of the connecting parts 410 and 420 from a main body part 401, similarly to the above-described embodiment. The insulating sheet 501 has a plurality of sheet extension parts 520c extending from a sheet side surface part 510 toward the plurality of connecting parts 410 and 420 each. That is, the insulating sheet 501 has two sheet extension parts 520c, and the two sheet extension parts 520c are arranged at positions corresponding to the connecting parts 410 and 420, respectively. The two sheet extension parts 520c are formed to have a width in the X-axis direction larger than that of each of the connecting parts 410 and 420.

As illustrated in FIGS. 7 and 8, since the two sheet extension parts 520c are arranged apart from each other, there is formed the central opening 501a having a shape of a cut out at a central portion in the X-axis direction of an end part of the insulating sheet 501 on the positive Z-axis plus direction side, between the two sheet extension parts 520c. The central opening 501a is arranged so as to face a gas release valve 121. On both sides in the X-axis direction of the two sheet extension parts 520c, there are formed the end openings 501b and 501c having a shape of a cut out at both end parts in the X-axis direction of an end part of the insulating sheet 501 on the Z-axis plus direction side. The end opening 501b is arranged so as to face a joint part (a swaged portion 210 in FIG. 8) between a positive electrode terminal 200 and a positive-electrode current collector 130 in the Z-axis direction. The end opening 501c is arranged so as to face a joint part (a swaged portion 310 in FIG. 8) between a negative electrode terminal 300 and a negative-electrode current collector 140 in the Z-axis direction.

As described above, according to the energy storage device 11 of the present modified example, an effect similar to that of the above-described embodiment can be obtained. In particular, since the insulating sheet 501 has the plurality of sheet extension parts 520c extending respectively toward the plurality of connecting parts 410 and 420 of the electrode assembly 400, an electrolyte solution can infiltrate into the central opening 501a between the plurality of sheet extension parts 520c at a time of electrolyte solution filling. Similarly, the electrolyte solution can infiltrate into the end openings 501b and 501c. This can improve an electrolyte solution filling property while ensuring the insulation between the case 100 and the connecting parts 410 and 420 projecting from the electrode assembly 400. Since the electrolyte solution filling property of the electrolyte solution can be improved at a time of manufacturing of the energy storage device 11, the energy storage device 11 can be easily manufactured.

Furthermore, since the end opening 501b is arranged so as to face the joint part (the swaged portion 210) of the positive electrode terminal 200 and the positive-electrode current collector 130, it is possible to prevent the sheet extension part 520c from interfering with the work of joining the positive electrode terminal 200 and the positive-electrode current collector 130. This can facilitate the work of joining the positive electrode terminal 200 and the positive-electrode current collector 130, and thus can facilitate manufacturing of the energy storage device 11. This similarly applies to the end opening 501c.

Since the central opening 501a is arranged to face the gas release valve 121 in the Z-axis direction, it is possible to prevent the sheet extension part 520c from blocking a flow of released gas when the gas release valve 121 is opened.

Other Modified Example

Although the energy storage devices 10 and 11 according to the embodiment and the modified example thereof have been described above, the present invention is not limited to the above embodiment and modified example. That is, the embodiment and the modified example thereof disclosed this time are exemplifications in all points and are not restrictive. Further, the scope of the present invention is defined by the claims, and includes all modifications within the meaning and scope equivalent to the claims.

In the above-described embodiment and modified example thereof, in the positive-electrode current collector 130, the electrode-assembly-side arrangement part 132 is bent toward the terminal-side arrangement part 131 after being joined to the connecting part 410 of the electrode assembly 400. However, the electrode-assembly-side arrangement part 132 may be configured not to be bent toward the terminal-side arrangement part 131 even after joining. Alternatively, the electrode-assembly-side arrangement part 132 may be bent to a side opposite to the terminal-side arrangement part 131 after joining. This similarly applies to the negative-electrode current collector 140.

In the above-described embodiment and modified example thereof, the positive-electrode current collector 130 has a shape in which the electrode-assembly-side arrangement part 132 is bent with respect to the terminal-side arrangement part 131. However, the positive-electrode current collector 130 may have a shape in which the electrode-assembly-side arrangement part 132 is not bent with respect to the terminal-side arrangement part 131, that is, a flat-plate shape.

In the above-described embodiment and modified example thereof, the insulating sheet 500 (or 501, this similarly applies hereinafter) has the sheet side surface part 510 including the sheet side surface parts 510a and 510b, the sheet extension part 520 (or 520c, this similarly applies hereinafter) including the sheet extension parts 520a and 520b, and the sheet bottom surface part 530. However, the insulating sheet 500 may be configured not to include any of the sheet side surface parts 510a and 510b, not to include any of the sheet extension parts 520a and 520b, and not to include the sheet bottom surface part 530.

In the above-described embodiment and modified example thereof, the sheet extension part 520 of the insulating sheet 500 is fixed the connecting parts 410 and 420 of the electrode assembly 400 by joining the current collector and the connecting parts 410 and 420 of the electrode assembly 400. However, the sheet extension part 520 is only required to be fixed to the electrode assembly 400, and may be fixed to the connecting parts 410 and 420 of the electrode assembly 400 by welding, adhesion, or the like, or may be fixed to any surface of the main body part 401 of the electrode assembly 400 by welding, adhesion, or the like.

In the above-described embodiment and modified example thereof, the opening 521 is formed in the sheet extension part 520 of the insulating sheet 500, and the joint part 700 is arranged to penetrate the opening 521. However, the opening 521 may not be formed in the sheet extension part 520, and the joint part 700 may be arranged on a side of the sheet extension part 520.

In the above-described embodiment and modified example thereof, the energy storage device 10 (or 11, this similarly applies hereinafter) is provided with the supporting plate 600 at a position sandwiching the connecting parts 410 and 420 of the electrode assembly 400 between with the current collector. However, in the energy storage device 10, the current collector and the connecting parts 410 and 420 of the electrode assembly 400 may be joined without the supporting plate 600 provided. When joining the current collector and the connecting parts 410 and 420 by ultrasonic joining, the supporting plate 600 need not be provided.

In the above-described embodiment and modified example thereof, the joint part 700 is a welded portion formed by resistance welding. However, the joining method on the joint part 700 is not limited to resistance welding, and various joining methods such as laser welding, ultrasonic joining, and swage joining can be applied.

In the above-described embodiment and modified example thereof, the connecting parts 410 and 420 of the electrode assembly 400 are portions that project in a rectangular shape from a part of the main body part 401. However, the shape of the connecting parts 410 and 420 is not particularly limited, and may be a polygonal shape other than a quadrangle, a semi-circular shape, a semi-oval shape, a semi-elliptical shape, and the like in plan view. The connecting parts 410 and 420 may be portions that project from the entire main body part 401 instead of a part of the main body part 401.

In the above-described embodiment and modified example thereof, the electrode assembly 400 has a so-called horizontal winding shape having a winding axis in the Z-axis direction. However, the electrode assembly 400 may have a so-called vertical winding shape having a winding axis in the X-axis direction or a shape obtained by folding an electrode plate into a bellows shape. The electrode assembly 400 may be a stack-shaped electrode assembly in which a plurality of flat-plate shaped electrodes are stacked. That is, the configurations of the above-described embodiment and modified example thereof can be applied to any electrode assembly having a connecting part.

In the above-described embodiment and modified example thereof, both the positive electrode side and the negative electrode side have the above-mentioned configuration. However, the positive electrode side or the negative electrode side may be configured not to have the above configuration.

Configurations established by optionally combining the above-described embodiment and modified example thereof are also included within the scope of the present invention.

The present invention can be realized not only as such an energy storage device 10 but also as the electrode assembly 400 and the insulating sheet 500.

INDUSTRIAL APPLICABILITY

The present invention can be applied to an energy storage device and the like, such as a lithium ion secondary battery.

DESCRIPTION OF REFERENCE SIGNS 10, 11: Energy storage device
130: Positive-electrode current collector
131: Terminal-side arrangement part
132: Electrode-assembly-side arrangement part
140: Negative-electrode current collector
141: Terminal-side arrangement part
142: Electrode-assembly-side arrangement part
400: Electrode assembly
401: Main body part
410, 420: Connecting part
430: Positive electrode plate
431, 441: Tab
440: Negative electrode plate
500, 501: Insulating sheet
510, 510a, 510b: Sheet side surface part
520, 520a, 520b, 520c: Sheet extension part
521, 521a, 521b: Opening
600: Supporting plate
700: Joint part

The invention claimed is:

1. An energy storage device comprising:
an electrode assembly;
a current collector; and
an insulating sheet,
wherein the electrode assembly includes a main body part, and a connecting part projecting from the main body part and connected to the current collector,
wherein the insulating sheet includes a sheet side surface part facing a side surface of the main body part, and a sheet extension part extending from the sheet side surface part,
wherein the connecting part and the current collector include a joint part in which both are joined,
wherein an opening is formed in the sheet extension part,
wherein the joint part is arranged to penetrate the opening,
wherein the opening is disposed between the lid body and the electrode assembly;
wherein the sheet extension part includes;
a first sheet extension part disposed on one of an outermost side in a direction that a plurality of the connecting parts are stacked; and
a second sheet extension part disposed on an other of an outermost side in the direction that the plurality of the connecting parts are stacked,
wherein both of the first sheet extension part and the second, sheet extension part include the opening, and
wherein both of the first sheet extension part and the second sheet extension part are bent together with the connecting part and directly fixed to the electrode assembly.

2. The energy storage device according to claim 1, wherein
the sheet extension part is fixed to the connecting part.

3. The energy storage device according to claim 1, wherein
the sheet extension part is arranged between the connecting part and the current collector and fixed to the electrode assembly.

4. The energy storage device according to claim 1, wherein
the electrode assembly includes a plurality of the connecting parts aligned in a direction intersecting a projecting direction of the connecting part from the main body part, and
the sheet extension part is arranged to extend over the plurality of connecting parts.

5. The energy storage device according to claim 1, wherein
the electrode assembly includes a plurality of the connecting parts aligned in a direction intersecting a projecting direction of the connecting part from the main body part,
the insulating sheet includes a plurality of the sheet extension parts extending from the sheet side surface part, and
each sheet extension part of the plurality of sheet extension parts extends to individually correspond to the plurality of connecting parts.

6. The energy storage device according to claim 1, wherein the sheet extension part is arranged between the connecting part and a supporting plate that sandwiches the connecting part with the current collector and fixed to the electrode assembly.

7. The energy storage device according to claim 6, wherein the supporting plate is joined to the current collector.

8. The energy storage device according to claim 1, wherein the sheet extension part is joined to the connecting part and the current collector.

9. The energy storage device according to claim 6, wherein
the connecting part, the current collector, and the supporting plate include the joint part in which the connecting part, the current collector, and the supporting plate are joined.

10. An energy storage device comprising:
an electrode assembly;
a current collector; and
an insulating sheet,
wherein the electrode assembly includes a main body part, and a connecting part projecting from the main body part and connected to the current collector,
wherein the insulating sheet includes a sheet side surface part facing a side surface of the main body part, and a sheet extension part extending from the sheet side surface part,
wherein the connecting part and the current collector include a joint part in which both are joined,
wherein an opening is formed in the sheet extension part,
wherein the joint part is arranged to penetrate the opening,
wherein the opening is disposed between the lid body and the electrode assembly,
wherein the sheet extension part includes;
  a first sheet extension part disposed on one of an outermost side in a direction that a plurality of the connecting parts are stacked; and
  a second sheet extension part disposed on an other of an outermost side in the direction that the plurality of the connecting parts are stacked,
wherein both of the first sheet extension part and the second sheet extension part include the opening, and
wherein both of the first sheet extension part and the second sheet extension part are bent together with the connecting part and directly fixed to the electrode assembly.

11. The energy storage device according to claim 10, wherein
the sheet extension part is arranged between the connecting part and the current collector and attached to the electrode assembly.

12. The energy storage device according to claim 10, wherein
the sheet extension part is arranged between the connecting part and a supporting plate that sandwiches the connecting part with the current collector and attached to the electrode assembly.

13. The energy storage device according to claim 12, wherein the supporting plate is joined to the current collector.

14. The energy storage device according to claim 10, wherein the sheet extension part is joined to the connecting part and the current collector.

15. The energy storage device according to claim 10, wherein
the electrode assembly includes a plurality of the connecting parts aligned in a direction intersecting a projecting direction of the connecting part from the main body part,
the insulating sheet includes a plurality of the sheet extension parts,
each sheet extension part of the plurality of sheet extension parts is arranged apart from each other in the direction intersecting a projecting direction of the connecting part from the main body part, and
the each sheet extension part extends to individually correspond to the plurality of connecting parts.

16. The energy storage device according to claim 10, wherein
the electrode assembly includes a positive electrode side connecting part and a negative electrode side connecting part aligned in a direction intersecting a projecting direction of the connecting part from the main body part,
the insulating sheet includes a positive electrode side sheet extension part and a negative electrode side sheet extension part each extending from the sheet side surface part the direction intersecting a projecting direction of the connecting part from the main body part,
the positive electrode side sheet extension part extends to correspond to the positive electrode side connecting part, and
the negative electrode side sheet extension part extends to correspond to the negative electrode side connecting part.

17. The energy storage device according to claim 10, further comprising:
an electrode terminal electrically connected with the connecting part; and
a lid plate which includes the electrode terminal, and
wherein the current collector includes a terminal-side arrangement part and an electrode-assembly-side arrangement part,
the terminal-side arrangement part is fixed to the lid plate together with the electrode terminal, and
the electrode-assembly-side arrangement part is joined to the connecting part in a state where the sheet extension part is sandwiched between the electrode-assembly-side arrangement part and the connecting part.

* * * * *